US008409008B2

(12) United States Patent
Asami

(10) Patent No.: US 8,409,008 B2
(45) Date of Patent: Apr. 2, 2013

(54) GAME SERVER, BYSTANDER EVALUATING METHOD, INFORMATION RECORDING MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 596 days.

(21) Appl. No.: 12/279,696

(22) PCT Filed: Feb. 13, 2007

(86) PCT No.: PCT/JP2007/052490
§ 371 (c)(1),
(2), (4) Date: Aug. 3, 2010

(87) PCT Pub. No.: WO2007/094303
PCT Pub. Date: Aug. 23, 2007

(65) Prior Publication Data
US 2010/0292009 A1 Nov. 18, 2010

(30) Foreign Application Priority Data
Feb. 15, 2006 (JP) .................................. 2006-037429

(51) Int. Cl.
*A63F 9/24* (2006.01)
(52) U.S. Cl. ............................................ 463/42; 463/31
(58) Field of Classification Search .................... 463/31, 463/42
See application file for complete search history.

(56) References Cited

U.S. PATENT DOCUMENTS

| 4,141,548 | A | * | 2/1979 | Everton | 463/4 |
| 5,034,807 | A | * | 7/1991 | Von Kohorn | 725/5 |
| 6,394,895 | B1 | * | 5/2002 | Mino | 463/3 |
| 6,692,359 | B1 | | 2/2004 | Williams et al. | |
| 6,840,861 | B2 | | 1/2005 | Jordan et al. | |

(Continued)

FOREIGN PATENT DOCUMENTS
EP 1557211 A 7/2005
JP 2000-501213 2/2000
(Continued)

OTHER PUBLICATIONS

Chinese Office Action with English Translation dated May 30, 2011.

(Continued)

*Primary Examiner* — Arthur O. Hall
*Assistant Examiner* — Steve Rowland
(74) *Attorney, Agent, or Firm* — Howard & Howard Attorneys PLLC

(57) ABSTRACT

A game management unit (20) manages a match-up game which progresses based on a move transmitted from a terminal of a player. At this time, moves are successively added as game record information in a history storing unit (206). When an expected move is transmitted from a terminal of a spectator before a move by the player is received, an expected move management unit (207) stores the expected move in an expected move storing unit (208). The expected move is stored in association with an actual move stored in the history storing unit (206). A spectator evaluation unit (209) compares each expected move stored in the expected move storing unit (208) with a corresponding move stored in the history storing unit (206) at a predetermined timing (e.g., at the time of resignation), and comprehensively evaluates the expected move of each spectator.

4 Claims, 14 Drawing Sheets

U.S. PATENT DOCUMENTS

| | | | |
|---|---|---|---|
| 7,351,149 B1 * | 4/2008 | Simon et al. | 463/42 |
| 2002/0115489 A1 | 8/2002 | Jordan et al. | |
| 2003/0038805 A1 * | 2/2003 | Wong et al. | 345/473 |
| 2004/0171381 A1 * | 9/2004 | Inselberg | 455/426.2 |
| 2005/0227757 A1 * | 10/2005 | Simon | 463/25 |
| 2006/0058103 A1 * | 3/2006 | Danieli et al. | 463/42 |

FOREIGN PATENT DOCUMENTS

| | | |
|---|---|---|
| JP | 2000-029653 | 2/2001 |
| JP | 2003-047769 | 2/2001 |
| JP | 2003-117248 A | 4/2003 |
| JP | 2003-251077 A | 9/2003 |
| TW | I234482 | 6/2005 |
| WO | WO 97/39811 A | 10/1997 |

OTHER PUBLICATIONS

International Search Report PCT/JP2007/052490 dated Mar. 27, 2007.

Professor Chess, "The Recon64 Portal," [online], [retrieved on Feb. 6, 2009 ]. Retrieved from the Internet <URL: www.archive.org/web/20060101044110/http://www.professorchess.com/recon64/>, 1 page.

Supplementary European Search Report EP07714072 dated Mar. 2, 2009, 6 pages.

Office Action of Jun. 3, 2009 for the counterpart Taiwanese Patent Application No. 096105659 and English translation of Office Action, 11 pages.

* cited by examiner

| PLAYER TERMINAL | ADDRESS | PORT | USER ID | NICKNAME | STAGE AND CLASS |
|---|---|---|---|---|---|
| | 123:123:123:123 | 1234, 1235 | ABC1234 | TARO | FIFTH STAGE |
| | 124:124:124:124 | 2345, 2346 | CDF4567 | JIRO | FOURTH STAGE |

FIG. 4A

| SPECTATOR TERMINAL | ADDRESS | PORT | USER ID | NICKNAME | STAGE AND CLASS |
|---|---|---|---|---|---|
| | 111:111:111:111 | 2111, 2112 | AAA1212 | HANAKO | SECOND CLASS |
| | 222:222:222:222 | 4321, 4322 | BBB2345 | SABURO | THIRD CLASS |
| | ⋮ | ⋮ | ⋮ | ⋮ | ⋮ |
| | 200:200:100:100 | 2468, 2469 | ZZZ9876 | SHIRO | FIRST STAGE |

FIG. 4B

| | BLACK | WHITE |
|---|---|---|
| USER ID | ABC1234 | CDF4567 |
| NICKNAME | TARO | JIRO |
| ELAPSED TIME | 05 MIN. 31 SEC. | 04 MIN. 12 SEC. |

| NUMBER OF MOVES | MOVE |
|---|---|
| 1 | ▲P−7f |
| 2 | △P−8d |
| 3 | ▲S−6h |
| ⋮ | ⋮ |
| 21 | ▲B−1a+ |
| 22 | △N−3c |

FIG. 6

| EXPECTED MOVE | USER ID |
|---|---|
| △P−4c | AAA1212 |
| △G−5c | CCC2323 |
| △P−8f | EEE4545 |
| ⋮ | ⋮ |
| △G−5c | YYY9876 |

NUMBER OF MOVES 22

FIG. 7

GAME SERVER, BYSTANDER EVALUATING METHOD, INFORMATION RECORDING MEDIUM, AND PROGRAM

TECHNICAL FIELD

The present invention relates to a game server, a spectator evaluation method, information recording medium and a program which are suitable for improving the amusingness for a spectator who watches a match-up game.

BACKGROUND ART

Game devices (video game device or the like) which allows a user to play a match-up game, such as Japanese chess, game of go, chess, Othello, and mah-jongg have been widely used. According to such game devices, a player can play a game with a computer, or can play a game with another player.

Recently, network-compatible match-up games which allow a user to play a game with a player at a remote location using a network like the Internet are developed.

There are game devices which allow a user who is not familiar with match-up games to learn rules thereof reasonably (and gradually). Disclosed as an example is a game system (program of match-up game) which allows a player to gradually learn the rule of a match-up game, how to proceed the game, the concept thereof, and the like while manipulating a character coming onto a story and clearing various events (see, for example, Patent Literature 1).

[Patent Literature 1] Unexamined Japanese Patent Application KOKAI Publication No. 2003-47769 (page 4 to page 16, and FIG. 5)

DISCLOSURE OF INVENTION

Problem to be Solved by the Invention

In general, according to the foregoing network-compatible match-up games, a user can participate the game not only as a player (opponent player) but also as a spectator who watches the match-up game of other players.

For example, a user accesses a lobby server and the like through a game terminal of the user, and enters, as a spectator, a desired match-up game that is held. As the user accesses a game server and the match-up game of other players starts, the content of that game is displayed on the game terminal of the user in real time.

By watching the match-up game of exemplary players (e.g., a person who has a degree that is higher than that of the user) in this manner, the spectator (user) can learn how to proceed the game and the concept thereof, and expect a move (next move), thereby improving the skill.

The game terminal of the spectator, however unilaterally displays the content of the match-up game, and this is like as if an actual match-up is broadcasted through a TV program, and it appears to be a reality that no ingenuity as the network-compatible match-up game is made so far.

Note that the spectator can announce a move (expected move) that the spectator thinks by himself/herself or can exchange opinions with other spectator using a chatting function (not transmitted to a player). However, there are spectators who do not fully utilize the chatting function, and spectators who do not want to make a statement through the chatting, and for such spectators, there is no difference from watching the match-up on TV.

Accordingly, it is necessary to develop a technology which allows a spectator to enjoy more through the features of network-compatible match-up games, unlike a case where a match-up is broadcasted through a TV program. That is, it is demanded to improve the amusingness of a spectator in a match-up game.

The present invention has been made in view of the foregoing circumstances, and it is an object of the invention to provide a game server, a spectator evaluation method, information recording medium, and a program which improves the amusingness of a spectator who watches a match-up game.

Means for Solving the Problem

A game server according to the first aspect of the invention manages a player terminal which executes a predetermined match-up game, and a spectator terminal for watching the match-up game, the player terminal and the spectator terminal are connected to the game server via a network, and the game server comprises a providing unit, an acquisition unit and an evaluation unit.

First, the providing unit provides a current status of the match-up game, which progresses based on moves successively acquired from the player terminal, to the spectator terminal. The acquisition unit acquires an expected move thought out by a spectator from the spectator terminal before a next move of the match-up game is acquired from the player terminal. The evaluation unit compares the acquired expected move by the spectator with an actual move acquired from the player terminal, and evaluates the expected move by the spectator.

That is, because the expected move transmitted from the spectator terminal is compared with an actual move and evaluated, the spectator watches the match-up game more seriously, and makes an effort to think a better expected move.

Accordingly, the amusingness of the spectator in the match-up game is improved.

A game server according to the second aspect of the invention manages a player terminal which executes a predetermined match-up game, and a spectator terminal for watching the match-up game, the player terminal and the spectator terminal are connected to the game server via a network, and the game server comprises a providing unit, an acquisition unit, and an evaluation unit.

First, the providing unit provides a current status of the match-up game, which progresses based on moves successively acquired from the player terminal, to the spectator terminal in real time. The acquisition unit acquires an expected move thought out by a spectator from the spectator terminal only before a next move of the match-up game is acquired from the player terminal. The evaluation unit compares the acquired expected move by the spectator with an actual move after the actual move is acquired from the player terminal, and evaluates the expected move by the spectator.

That is, only an expected move which is not a last-out is compared with an expected move by another spectator having a skill greater than or equal to a certain level and is comparatively evaluated. Accordingly, the expected move transmitted from the spectator terminal is compared with an actual move and evaluated, so that the spectator watches the match-up game more seriously, and makes an effort to think a better expected move.

Accordingly, the amusingness of the spectator in the match-up game is improved.

The evaluation unit may highly evaluate an expected move by the spectator than what is predetermined when it is determined that the expected move by the spectator matches a move by a first player, and the move by the first player is a good move with regard to a move by a second player.

In this case, the expected move by the spectator can be evaluated appropriately.

The evaluation unit may give a certain evaluation to the expected move by the spectator even when the expected move by the spectator does not match a move by a first player, but when it is determined that the move by the first player at the time of comparison is a bad move with regard to a move by the first player after a move by a second player.

In this case, the expected move by the spectator can be evaluated appropriately.

A game server according to the third aspect of the invention manages a player terminal which executes a predetermined match-up game, a spectator terminal which is for watching the match-up game, the player terminal and the spectator terminal are connected to the game server via a network, and the game server comprises a providing unit, an acquisition unit, and an evaluation unit.

First, the providing unit provides a current status of the match-up game, which progresses based on moves successively acquired from the player terminal, to each spectator terminal in real time. The acquisition unit acquires an expected move thought out by a spectator from each spectator terminal only before a next move of the match-up game is acquired from the player terminal. The evaluation unit collects expected moves by spectators having a skill greater than or equal to a predetermined level from all expected moves acquired by the acquisition unit, and comparatively evaluates an expected move by a spectator based on a rate of the expected move by the spectator to be evaluated in the collected expected moves.

That is, only an expected move which is not a last-out is compared with an expected move by another spectator having a skill greater than or equal to a certain level and is comparatively evaluated. Accordingly, the expected move transmitted from the spectator terminal is compared with an actual move and evaluated, so that the spectator watches the match-up game more seriously, and makes an effort to think a better expected move.

Accordingly, the amusingness of the spectator in the match-up game is improved.

A spectator evaluation method according to the fourth aspect of the invention is for a server that manages a player terminal which executes a predetermined match-up game, and a spectator terminal for watching the match-up game, the player terminal and the spectator terminal being connected to the server via a network, and the method comprises a providing step, an acquisition step, and an evaluation step.

First, in the providing step, a current status of the match-up game, which progresses based on moves successively acquired from the player terminal, is provided to the spectator terminal in real time. In the acquisition step, an expected move thought out by a spectator is acquired from the spectator terminal only before a next move of the match-up game is acquired from the player terminal. In the evaluation step, the acquired expected move by the spectator is compared with an actual move after the actual move is acquired from the player terminal, and the expected move by the spectator is evaluated.

That is, only an expected move which is not a last-out is compared with an expected move by another spectator having a skill greater than or equal to a certain level and is comparatively evaluated. Accordingly, the expected move transmitted from the spectator terminal is compared with an actual move and evaluated, so that the spectator watches the match-up game more seriously, and makes an effort to think a better expected move.

Accordingly, the amusingness of the spectator in the match-up game is improved.

A program according to the fifth aspect of the invention is configured to control a computer (including electrical devices) that manages a player terminal which executes a predetermined match-up game and a spectator terminal for watching the match-up game, the player terminal and the spectator terminal are connected to the computer via a network, to function as the foregoing game server.

This program can be stored in a computer-readable information recording medium, such as a compact disk, a flexible disk, a hard disk, a magnet-optical disk, a digital vided disk, a magnetic tape, and a semiconductor memory.

The foregoing program can be distributed and sold via a computer communication network independently from a computer which executes the program. Moreover, the information recording medium can be distributed and sold independently from the computer.

Effect of the Invention

According to the invention, it is possible to improve the amusingness of a spectator who watches a match-up game.

BRIEF DESCRIPTION OF DRAWINGS

FIG. 4A is a schematic diagram showing an example of terminal information of a player;

FIG. 4B is a schematic diagram showing an example of terminal information of a spectator;

FIG. 6 is a schematic diagram showing an example of game record information;

FIG. 7 is a schematic diagram showing an example of expected move information and it is a schematic diagram for showing;

DESCRIPTION OF REFERENCE NUMERALS

Figure 1:
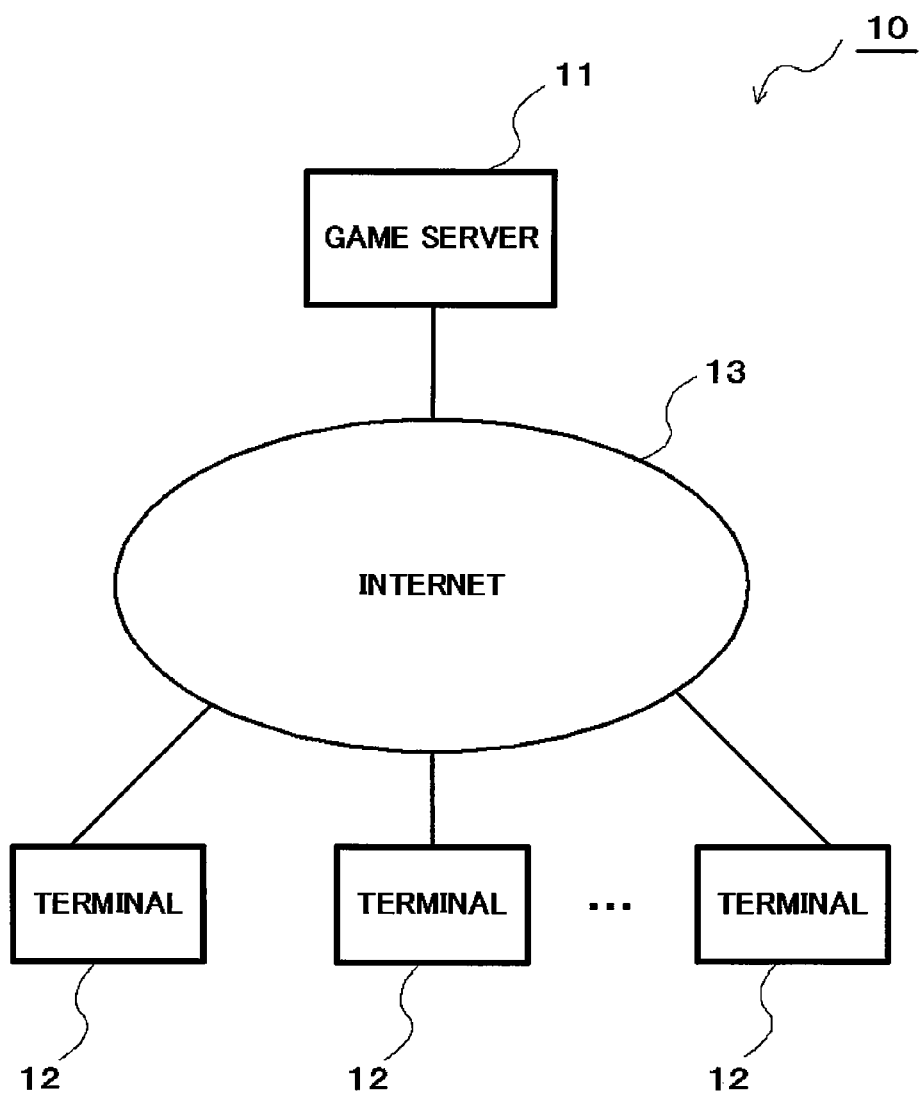
FIG. 1 is a schematic diagram showing the general structure of a game system according to an embodiment of the invention.

11 game server
12, 22 terminal 100 game device
101 CPU
102 ROM
103 RAM
104 interface
105 controller
106 external memory
107 DVD-ROM drive
108 image processor
109 sound processor
110 NIC
201 terminal-information storing unit
202 information reception unit
203 process control unit
204 game management unit
205 game-information storing unit
206 history storing unit
207 expected move management unit
208 expected move storing unit
209 spectator evaluation unit
210 information transmission unit
301 board-information storing unit
302 rule storing unit
303 operation unit
304 control unit
305 communication unit
306 display unit
501 game record storing unit
502 expected move processor
503 expected move storing unit

BEST MODE FOR CARRYING OUT THE INVENTION

An explanation of embodiments of the invention will be given below. While the following describes embodiments in which the present invention is adopted to a game device for the ease of understanding, the invention can be likewise adopted to various information processing devices, such as a computer, a PDA, and a cellular phone device. That is, the embodiments to be described below are intended for explanation only, and not to limit the scope of the invention. Therefore, those skilled in the art can employ embodiments in which the individual elements or all elements are replaced with equivalent ones, and which are also included in the scope of the invention.

First Embodiment

FIG. 1 is a schematic diagram showing the general structure of a game system including a game server or the like according to an embodiment of the invention.

In this game system 10, a game server 11 which provides (manages) match-up games is disposed over the Internet 13. Each terminal 12 (player terminal or spectator terminal to be discussed below) of the game system 10 is connected to the game server 11 via the Internet 13 in a communicationable manner.

Note that terminals 12 can directly and mutually communicate with each other by, a so-called peer-to-peer communication technology. For the ease of understanding, an explanation will be given of an example where the terminal 12 is a game device connectable to the Internet.

Figure 2:
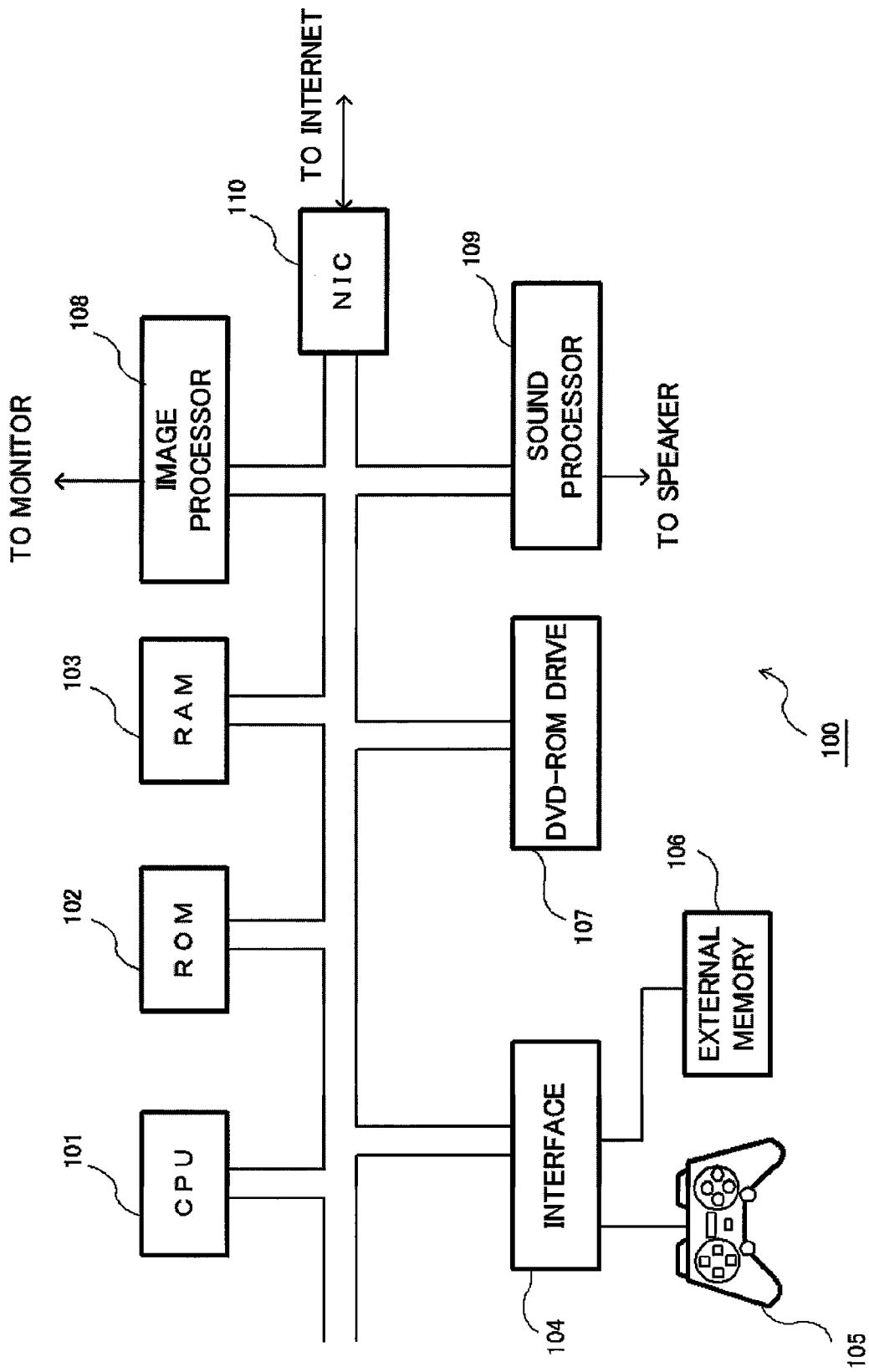
FIG. 2 is a schematic diagram showing the general structure of a game device according to the embodiment of the invention.

FIG. 2 is a schematic diagram showing the general structure of a game device 100 serving as the terminal 12 of the embodiment. Hereinafter, an explanation will be given with reference to this drawing.

The game device 100 has a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processor 108, a sound processor 109, and an NIC (Network Interface Card) 110.

As a DVD-ROM storing a program and data for a game is loaded into the DVD-ROM drive 107 and the game device 100 is powered on, the program is executed to realize the terminal 12 of the embodiment.

The CPU 101 controls the general operation of the game device 100, and is connected to individual components to exchange a control signal and data therewith.

An IPL (Initial Program Loader) which is executed immediately after power-on is recorded in the ROM 102. As the IPL is executed, the program recorded in the DVD-ROM is read into the RAM 103 and is executed by the CPU 101. Further, the RAM 102 stores a program and various data for an operating system necessary for controlling the overall operation of the game device 100.

The RAM 103 is for temporarily storing data and programs, and retains the program and data read from the DVD-ROM, and other data needed for progressing a game and chat communication.

The controller 105 connected via the interface 104 receives an operation input which is made when a user plays a game. For example, the controller 105 receives an input of character string (message) or the like in accordance with the operation input.

The external memory 106 detachably connected via the interface 104 rewritably stores data indicating the progress status of the game, data of chat communication logs (records), etc. As the user makes an instruction input via the controller 105, these data can adequately be recorded in the external memory 106.

The program for realizing the game and the image data and sound data accompanying the game are recorded in the DVD-ROM to be loaded into the DVD-ROM drive 107. Under the control of the CPU 101, the DVD-ROM drive 107 performs a process of reading from the DVD-ROM loaded therein to read a necessary program and data, and these are temporarily stored in the RAM 103 or the like.

The image processor 108 processes data read from the DVD-ROM by means of the CPU 101 and an image operation processor (not shown) that the image processor 108 has, and then records the data in a frame memory (not shown) in the image processor 108. The image information recorded in the frame memory is converted to a video signal at a predetermined synchronous timing, which is in turn output to a monitor (not shown) connected to the image processor 108. Thereby, image displays of various types are available.

Note that the image operation processor can enable fast execution of an overlay operation of a two-dimensional image, a transparent operation like a blending, and various kinds of saturate operations.

It is also possible to enable fast execution of an operation of rendering polygon information which is arranged in virtual three-dimensional space and to which various kinds of texture information are added, by a Z buffer scheme to acquire a rendered image with a downward view of a polygon, arranged in the virtual three-dimensional space, from the predetermined view point position.

Further, the CPU 101 and the image operation processor cooperate to be able to write a string of characters as a two-dimensional image in the frame memory or on each polygon surface according to font information which defines the shapes of characters. The font information is recorded in the ROM 102, but exclusive font information recorded in the DVD-ROM can be used.

The sound processor 109 converts sound data read from the DVD-ROM to an analog sound signal, and outputs the sound signal from a speaker (not shown) connected thereto. Under the control of the CPU 101, the sound processor 109 generates sound effects and music data to be generated during progress of the game, and outputs sounds corresponding thereto from the speaker.

The NIC 110 serves to connect the game device 100 to a computer communication network (not shown), such as the Internet. The NIC 109 includes one compatible to the 10 BASE-T/100 BASE-T standard used in constituting a LAN (Local Area Network), an analog modem for connecting to the Internet using a telephone circuit, an ISDN (Integrated Services Digital Network) modem, an ADSL (Asymmetric Digital Subscriber Line) modem, a cable model for connecting to the Internet using a cable television circuit, or the like, and an interface (not shown) which intervenes between these modems and the CPU 101.

In addition, the game device 100 may be configured to achieve the same functions as the ROM 102, the RAM 103, the external memory 106, and the DVD-ROM or the like which is to be loaded into the DVD-ROM drive 107 by using a large-capacity external storage device, such as a hard disk.

Moreover, a configuration that a keyboard for receiving an edition input of character strings from the user, a mouse for receiving a designation of various positions and a selection input, and the like are connected can be employed.

A general computer (general-purpose personal computer or the like) can be used as the terminal 12 instead of the game device 100 of the embodiment. For example, like the game device 100, the general computer has a CPU, a RAM, a ROM, a DVD-ROM drive, an NIC, an image processor with a simpler function than that of the game device 100, and a hard disk as an external storage device, and can use a flexible disk, a magnet-optical disk, an electromagnetic tape, and the like. Moreover, a keyboard and a mouse are used as input devices instead of the controller. As a game program is installed and executed, the general computer functions as the terminal 12.

According to normal game system, such a general computer is often used instead of a game exclusive machine, but in the embodiment, an explanation will be given of the terminal 12 which is the game device 100 shown in FIG. 2 without any annotation. Note that a component of the game device 100 can be replaced with a component of a general computer appropriately in accordance with necessity, and such embodiments should be included in the scope of the invention.

The game server 11 is realized by a general computer, but it is possible to use a predetermined game device 100 in plural game devices 100 (terminals 12) as the game server 11. The game device 100 and a general computer do not have a large difference in the structure and the function. That is, the game server 11 can be realized by the game device 100.

(General Structure of Game Server)

Figure 3:
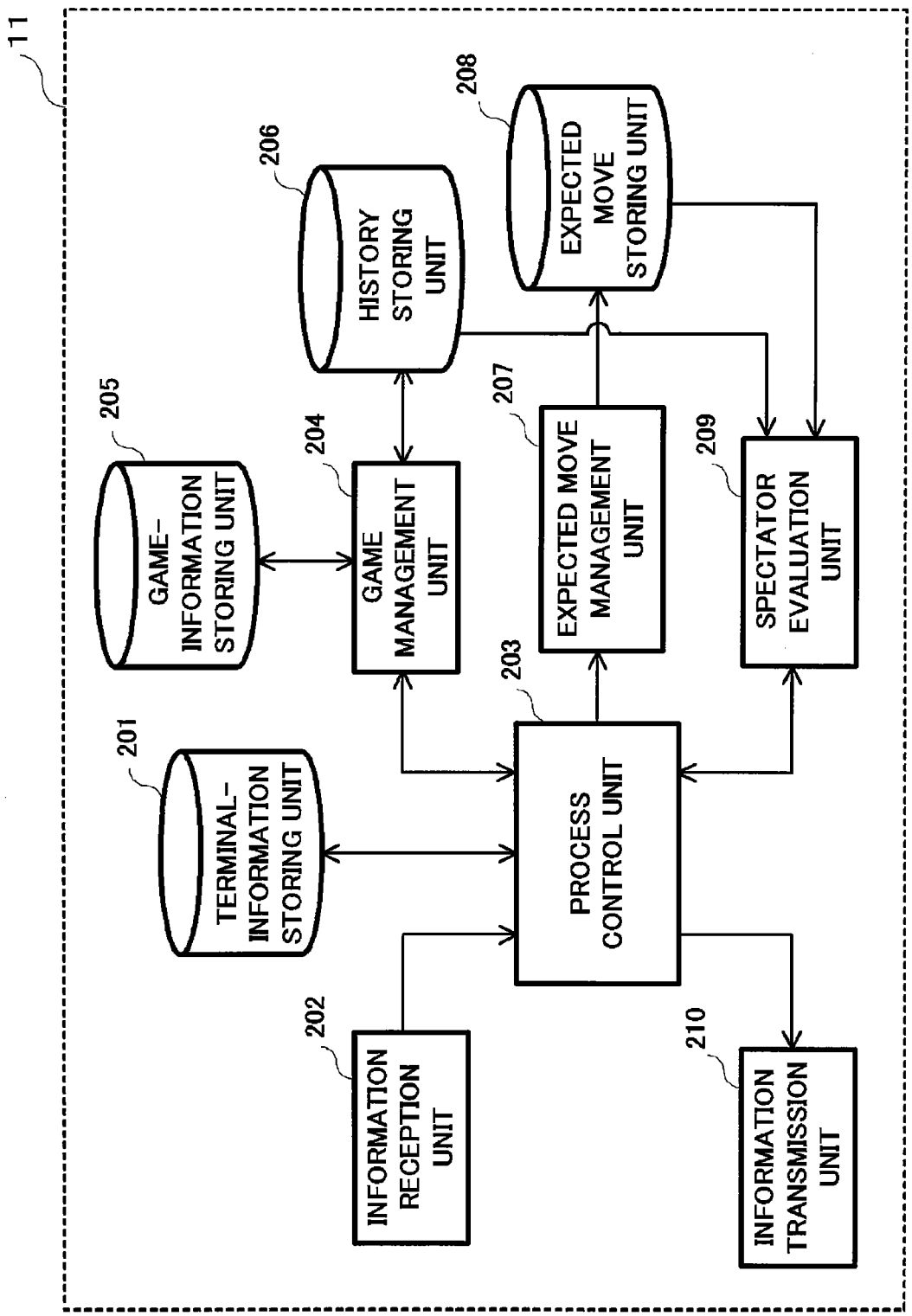
FIG. 3 is a schematic diagram showing the general structure of a game server according to the embodiment of the invention.

FIG. 3 is a schematic diagram showing the general structure of the game server 11 according to the embodiment. As an example, the game server 11 provides a match-up game of Japanese chess (Japanese chess game). Hereinafter, an explanation will be given with reference to this drawing.

The game server 11 has a terminal-information storing unit 201, an information reception unit 202, a process control unit 203, a game management unit 204, a game-information storing unit 205, a history storing unit 206, an expected move management unit 207, an expected move storing unit 208, a spectator evaluation unit 209, and an information transmission unit 210.

First, the terminal-information storing unit 201 stores information on a terminal 12 (player terminal) of a player who actually plays a match-up game (Japanese chess), and information on a terminal 12 (spectator terminal) of a spectator who watches the match-up.

For example, the terminal-information storing unit 201 stores terminal information exemplified in FIGS. 4A and 4B. FIG. 4A shows an example of information on the terminal 12 used by a player, and FIG. 4B shows an example of information on the terminal 12 used by a spectator.

Those pieces of terminal information include information necessary to communicate with each terminal 12, such as an address (global IP address), and a port.

Such terminal information is acquired from a non-illustrated lobby server or the like. For example, when a user enters as a player in the lobby server, the terminal 12 thereof is registered as a player terminal, and when the user enters as a spectator, the terminal 12 thereof is registered as a spectator terminal.

Returning to FIG. 3, the information reception unit 202 receives operation information or the like transmitted from each terminal 12 (player terminal and spectator terminal). For example, the terminal 12 of a player transmits operation information indicating a move (next move), and the terminal 12 of a spectator transmits operation information indicating a move (expected move) thought out by a spectator, and the information reception unit 202 receives those pieces of operation information.

In addition, after a match-up game is started, the terminal 12 of a participating spectator or the like transmits information for requesting the latest game status (board information to be discussed later or the like), and information for requesting the progression so far (game record information to be discussed later) during the progress of the game, and the information reception unit 202 receives such pieces of information.

Note that information received by the information reception unit 202 is added with a header, and the header includes information, such as an address, and a port of a terminal which has sent information to the information reception unit 202.

The process control unit 203 controls the game server 11 entirely.

For example, as the information reception unit 202 receives operation information or the like, the process control unit 203 acquires that information from the information reception unit 202, compares the address and port in the header added thereof with information (address, port, and the like) stored in the terminal-information storing unit 201, and determines whether the information is one transmitted from the terminal 12 of a player or one transmitted from the terminal 12 of a spectator. When it is determined that the information indicates a move transmitted from the terminal 12 of the player, the process control unit 203 provides that information to the game management unit 204.

As the information on a move is provided to the game management unit 204 and game information (board information or the like) in the game information storing unit 205 is updated, the process control unit 203 acquires the updated information from the game management unit 204, and transmits the acquired information to each terminal 12 through the information transmission unit 210. That is, the process control unit refers to the terminal information in the terminal-information storing unit 201, and transmits the updated information to individual terminals 12 of the player and the spectator.

When it is determined that information received by the information reception unit 202 indicates an expected move transmitted from the terminal 12 of the spectator, the process control unit 203 provides that information to the expected move management unit 207.

As the spectator evaluation unit 209 evaluates the expected move by the spectator and a skill (stage, class) is certified based on the evaluation result, the process control unit 203 acquires the certification information, and transmits that information to the terminal 12 of the spectator through the information transmission unit 210.

The game management unit 204 manages a match-up game played by the players. That is, the game management unit 204 manages a Japanese chess game progressed in accordance with information on a move (operation information or the like) alternately transmitted from the individual terminals 12 of the players.

For example, as information on a move is provided from the process control unit 203, the game management unit 204 appropriately updates game information (board information or the like) stored in the game-information storing unit 205 in accordance with the move. Moreover, the game management unit 204 adds information on the move to the game record information stored in the history storing unit 206.

The game management unit 204 provides the updated game information (update information) to the process control unit 203.

Figures 5A, 5B:
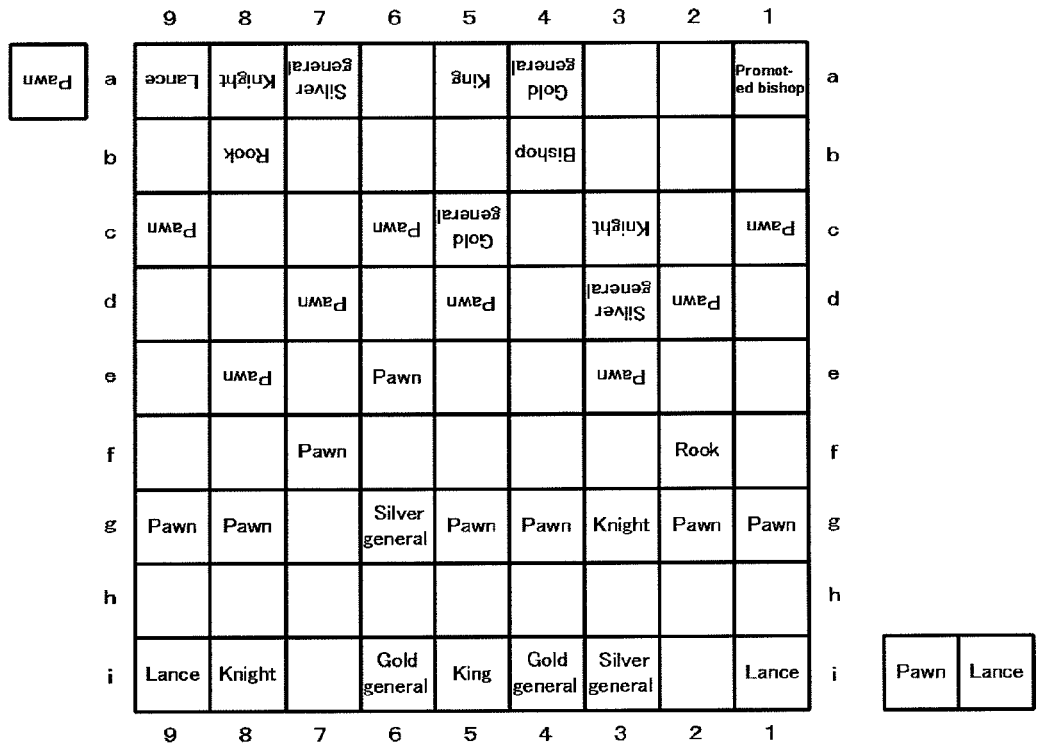
FIG. 5A is a schematic diagram visually showing an example of board information.
FIG. 5B is a schematic diagram showing an example of management information.

The game-information storing unit 205 stores game information shown in FIG. 5A and FIG. 5B. FIG. 5A shows an example of the board information (information on the position of a piece, information on pieces in hand), and FIG. 5B shows an example of management information on black/white.

Note that FIG. 5A visualizes and represents the board information for the ease of understanding, but in the reality, for example, the board information is stored as information that numeric data is disposed on a two-dimensional array (table) or the like.

Such game information is appropriately updated by the game management unit 204 corresponding to the progress of the game in accordance with a move by the player.

The history storing unit 206 stores the game record information shown in FIG. 6. The game record information indicates examples of the procedure of each player (history of move) at a match-up, and is successively added and stored by the game management unit 204.

Returning to FIG. 3, the expected move management unit 207 manages an expected move (next move) thought out by the spectator. That is, the expected move management unit 207 stores an expected move arbitrarily transmitted from the terminal 12 of the spectator to the expected move storing unit 208 and manages the expected move.

For example, as information on an expected move is provided from the process control unit 203, the expected move management unit 207 stores the expected move together with a user ID in the expected move storing unit 208. Thereafter, as an actual move by the player is added in the history storing unit 206, the expected move management unit 207 manages the move in the history storing unit 206 in association with the expected move in the expected move storing unit 208.

The expected move management unit 207 sets an expected move acquired from the terminal 12 of the spectator before a move by the player (move corresponding to expected move) is acquired as effective, and sets an expected move acquired after an actual move is acquired as no effect. That is, only effective expected moves which are not last-out are stored in the expected move storing unit 208.

The expected move storing unit 208 stores expected move information shown in FIG. 7. The expected move information is an example of information on an expected move arbitrarily transmitted from each terminal 12 of a spectator, and is successively stored by the expected move management unit 207.

Such expected move information is associated with a move in the history storing unit 206 (actual move by player) with a value of the number of moves, for example.

Returning to FIG. 3, the spectator evaluation unit 209 evaluates each expected move by a spectator at a predetermined timing.

For example, the spectator evaluation unit 209 compares each expected move stored in the expected move storing unit 208 with a corresponding move (game record) stored in the history storing unit 206 after the game is finished (after resignation), and comprehensively evaluates the expected move by the spectator. As an example, the spectator evaluation unit counts a rate that an expected move matches an actual move for each spectator, and evaluates the spectator in accordance with that rate. The evaluation of the spectator may be appropriately corrected by setting a predetermined weight to an expected move matching an actual move which had an impact on the game situation, or by setting a predetermined weight to an expected move matching an actual move of the winner.

The spectator evaluation unit 209 certifies a stage or a class representing the game skill based on an evaluation result, and provides certification information together with a user ID to the process control unit 203.

The information transmission unit 210 is controlled by the process control unit 203, transmits the foregoing update information to each terminal 12, and appropriately transmits the foregoing certification information to each terminal 12 of a spectator.

That is, the information transmission unit 210 transmits the content of a match-up game in real time to each terminal 12, and transmits the evaluation result of an expected move by a spectator (certification information) to a corresponding terminal 12 at a predetermined timing (e.g., at a time of resignation).

(General Structure of Terminal)

Figure 8:
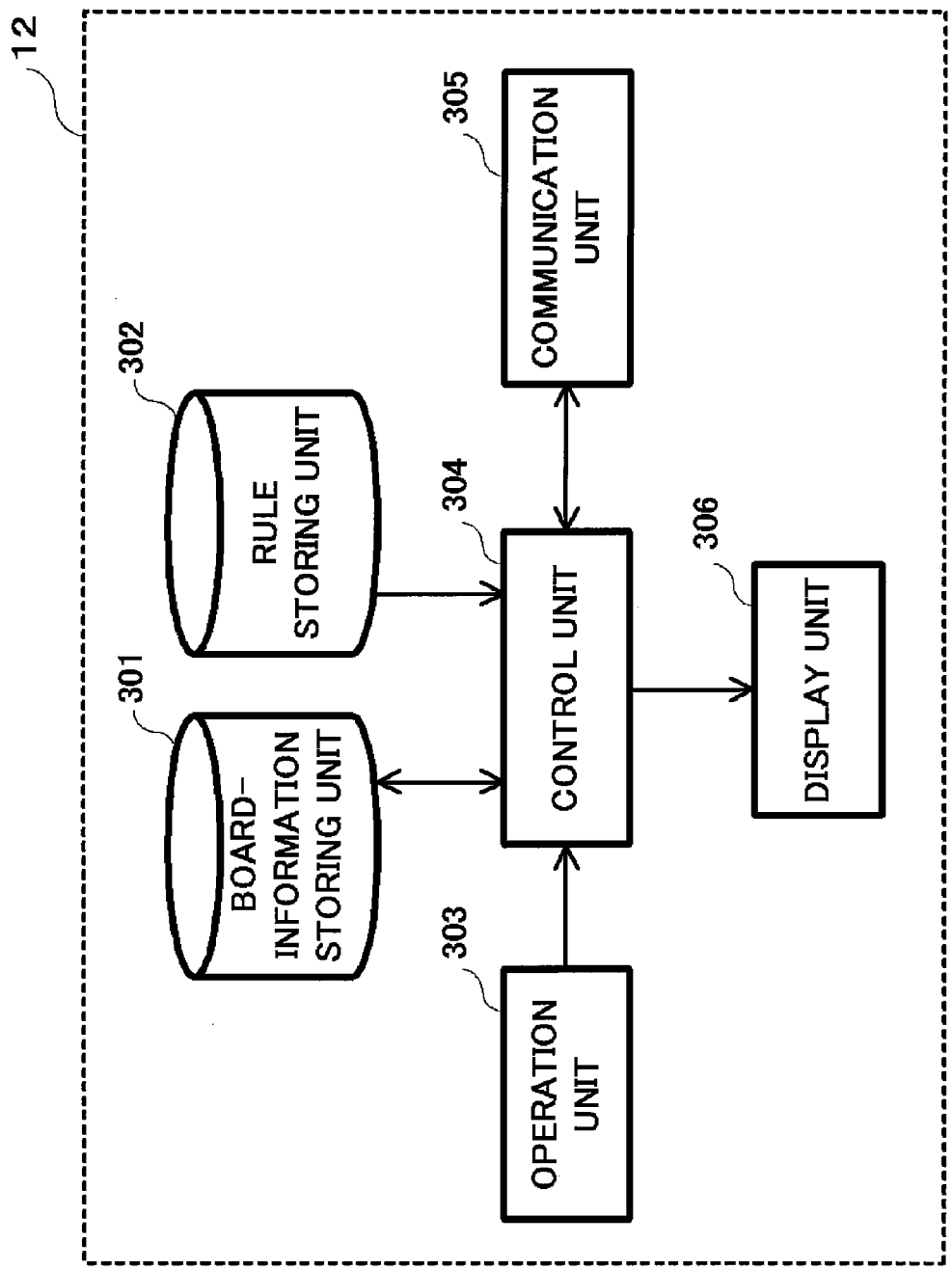
FIG. 8 is a schematic diagram showing the general structure of a terminal according to the embodiment of the invention.

FIG. 8 is an explanatory diagram showing the general structure of the terminal 12 (foregoing game device 100) according to the embodiment. Hereinafter, an explanation will be given with reference to this drawing.

The terminal 12 has a board-information storing unit 301, a rule storing unit 302, an operation unit 303, a control unit 304, a communication unit 305, and a display unit 306. The terminal 12 access a lobby server or the like, and enters as a player or a spectator, thereby becoming communicationable with the game server 11.

The board-information storing unit 301 stores the board information (information on the position of a piece, information on pieces in hand). That is, the board-information storing unit stores the same information as the board information stored in the game server 11 (game-information storing unit 205) and shown in FIG. 5A.

More specifically, as update information or the like is transmitted from the game server 11, the control unit 304 appropriately updates the board information, thereby establishing a synchronization with the board information in the game server 11.

The RAM 103, the external memory 106, and the like may function as such a board-information storing unit 301.

The rule storing unit 302 stores information defining the rule or the like of the Japanese chess game. For example, the rule storing unit 302 stores information on, for example, how to arrange pieces, a movement condition of a piece, an irregularity like NIFU, and a condition of NARI/FUNARI.

Those pieces of information are used whether or not a move by the user (player or spectator) is acceptable based on the rule when the user moves a piece (or adding a piece in hand) as a next move (actual move or expected move).

The RAM 103, the external memory 106, and the like may function as such a rule storing unit 302.

The operation unit 303 receives various operation instructions input by the user (player or spectator).

For example, the operation unit 303 receives an instruction of, for example, moving an arbitrarily piece on the board to a specific arbitrary position, or of adding a piece in hand to an arbitrary position. The operation unit 303 provides the content of the received instruction to the control unit 304.

Note that the controller 105 may function as such an operation unit 303.

The control unit 304 controls the terminal 12 entirely. The control unit 304 appropriately performs a different control in accordance with whether the terminal 12 is used by a player (whether a user is entered as a player) or the terminal is used by a spectator (a user is entered as a spectator).

For example, as receiving update information or the like from the game server 11 through the communication unit 305, the control unit 304 updates the board information stored in the board-information storing unit 301. In accordance with the updated board information, the control unit 304 displays a game screen including an image of the Japanese chess board, etc. on the display unit 306.

Moreover, as the content of an instruction (movement of a piece or the like) is provided from the operation unit 303, the control unit 304 refers to the information stored in the rule storing unit 302, and checks whether or not the operation instruction follows the rule. In a case where it follows the rule, the control unit 304 transmits the operation instruction as operation information (move or expected move) to the game server 11 through the communication unit 305. On the other hand, in a case where it does not follow the rule, an error message or the like is merely displayed on the display unit 306, and the operation instruction is not transmitted to the game server 11.

The CPU 101 may function as such a control unit 304.

The communication unit 305 is controlled by the control unit 304, and performs communication with the game server 11 or the like.

For example, the communication unit 305 transmits the foregoing operation information (move or expected move) to the game server 11, and receives update information or the like transmitted from the game server 11.

Further, in a case where the terminal 12 is a spectator terminal, the communication unit 305 receives the evaluation result of an expected move (certification information) transmitted from the game server 11.

The NIC 110 may function as such a communication unit 305.

The display unit 306 generates a game screen of the Japanese chess game or the like, and displays the game screen.

Figure 9A:
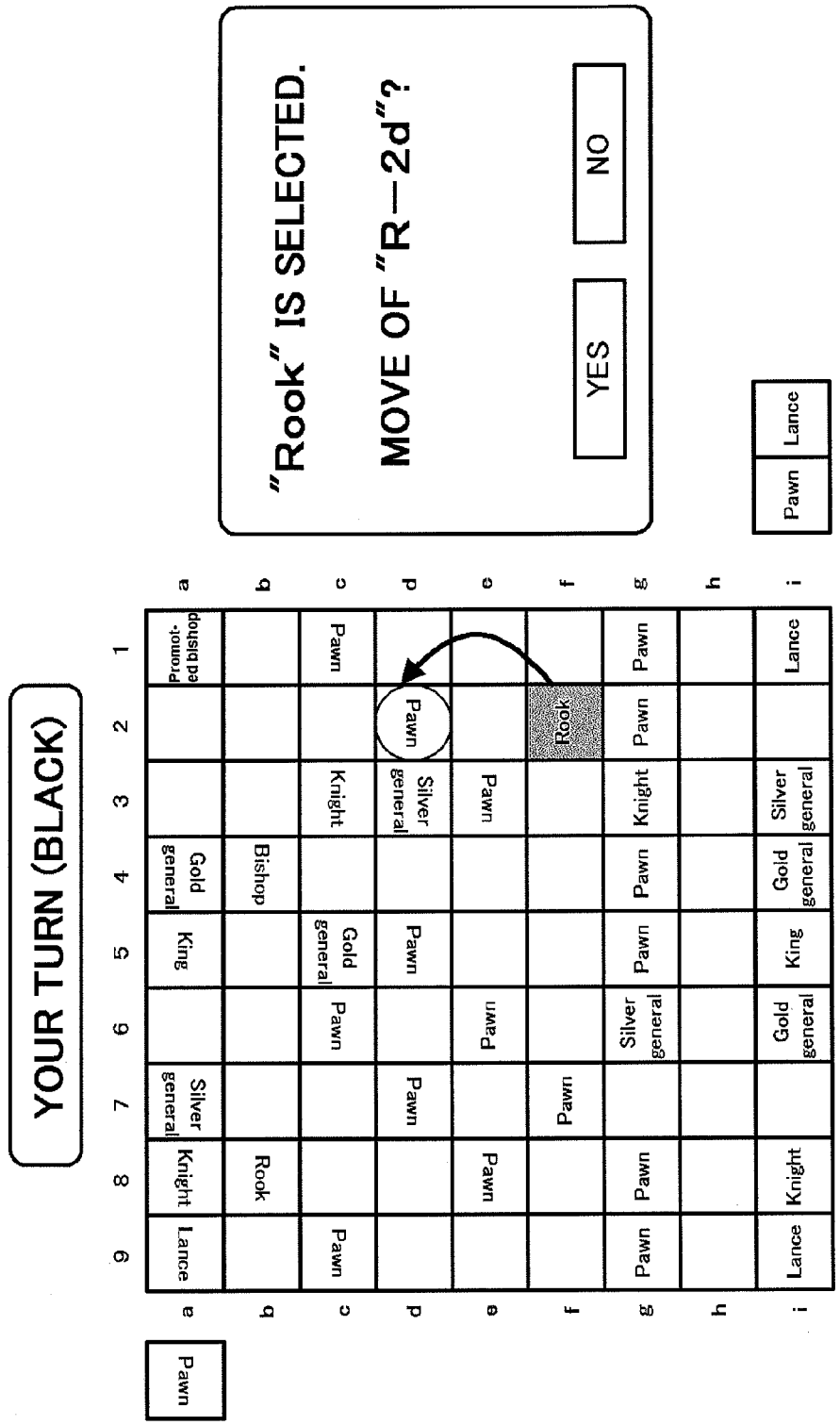
FIG. 9A is a schematic diagram showing an example of a game screen displayed on the terminal of a player.
Figure 9B:
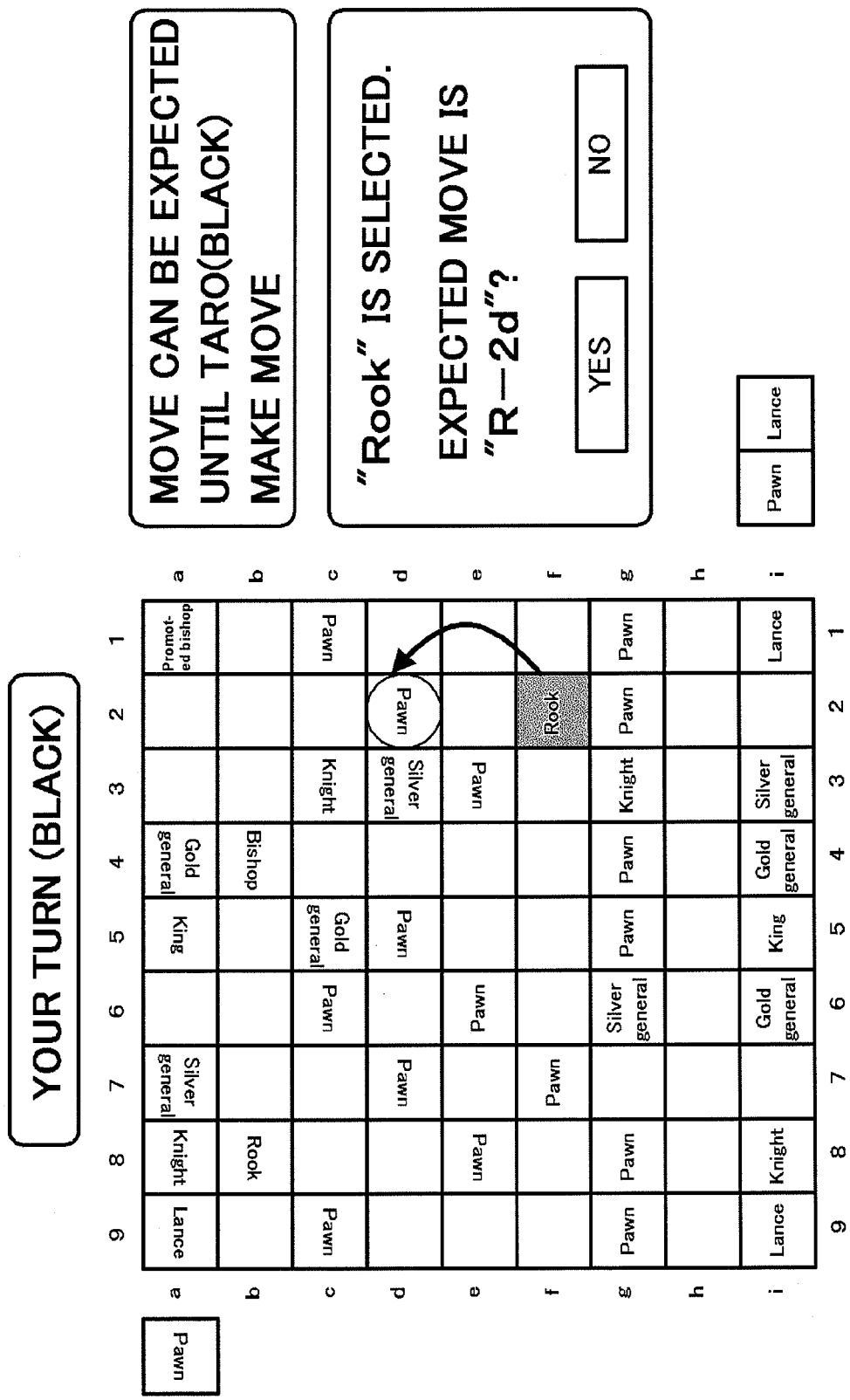
FIG. 9B is a schematic diagram showing an example of a game screen displayed on the terminal of a spectator.

For example, the display unit 306 displays game screens shown in FIGS. 9A, and 9B. FIG. 9A shows an example of a game screen displayed when the terminal 12 is the player terminal, and FIG. 9B shows an example of a game screen displayed when the terminal 12 is the spectator terminal.

That is, when the player thinks moves while viewing the game screen shown in FIG. 9A, the spectator can view the game screen shown in FIG. 9B, and transmit a move (expected move) thought out by himself/herself to the game server 11 by operating the operation unit 303.

The image processor 108 and a monitor or the like connected thereto may function as such a display unit 306.

(Operation of Game Server)

Figure 10:
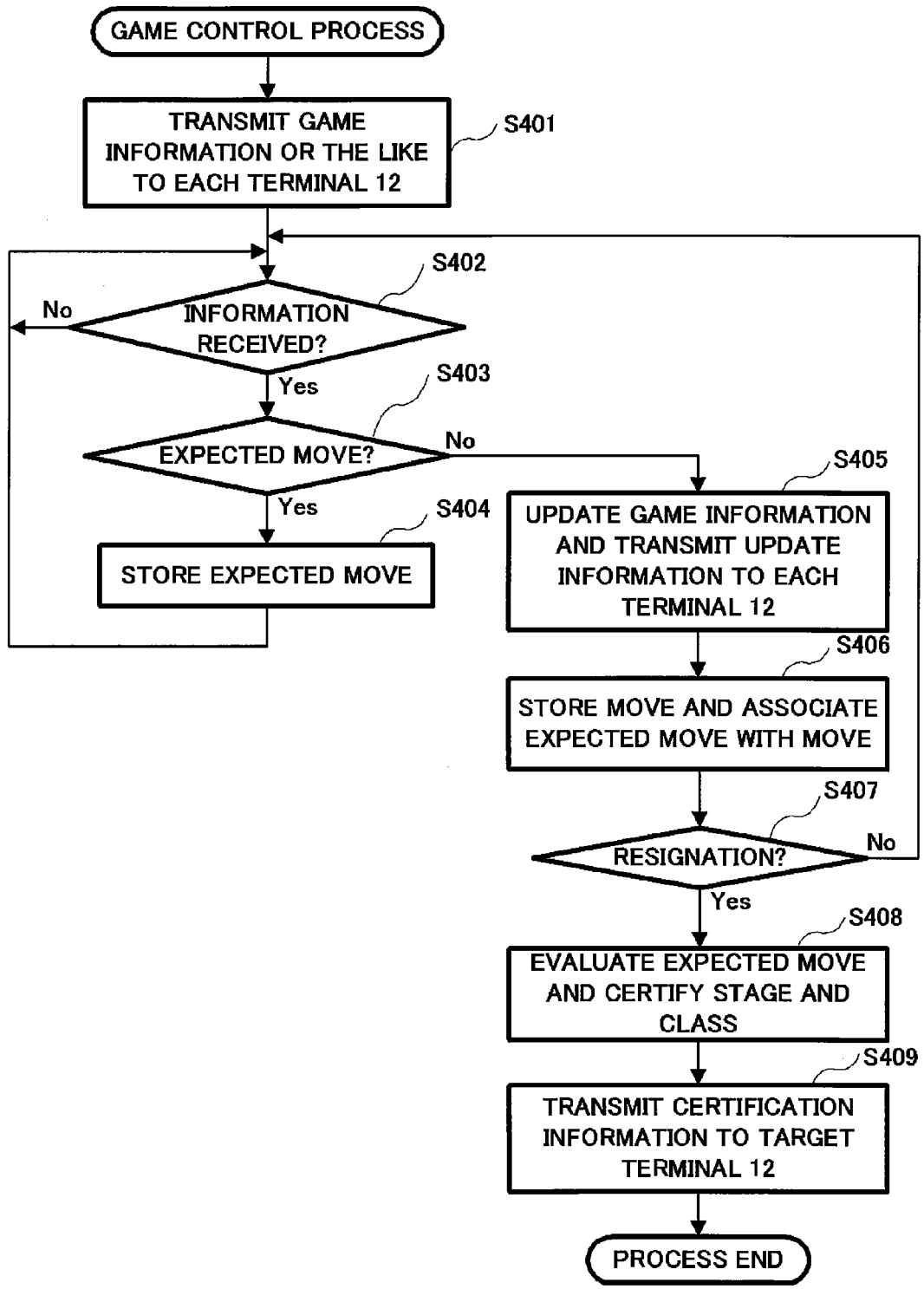
FIG. 10 is a flowchart for explaining a game control process executed by the game server.

FIG. 10 is a flowchart showing the flow of a game control process executed by the game server 11. Hereinafter, an explanation will be given with reference to this drawing. The game control process is executed together with the start of the Japanese chess game. It is supposed that the terminal-information storing unit 201 of the game server 11 registers (stores) information on the entered player and the terminal 12 of a spectator beforehand.

First, the game server 11 transmits the game information or the like to each terminal 12 with the start of the game (step S401). That is, the game server 11 refers to the information stored in the terminal-information storing unit 201, and transmits initial board information or the like to the terminal 12 of the player and that of the spectator.

The game server 11 stands by until receiving information transmitted from any terminal 12 (step S402).

That is, the game server 11 waits for information on a move transmitted from the terminal 12 of the player or information on an expected move transmitted from the terminal 12 of the spectator, etc.

As receiving information transmitted from any terminal 12 (step S402: YES), the game server 11 determines whether or not that information is an expected move (step S403). That is, it is determined whether or not received information is an expected move transmitted from the terminal 12 of the spectator or a move transmitted from the terminal 12 of the player.

When the received information is not either an expected move or a move (e.g., when receiving information transmitted from the terminal 12 of a spectator who participate in the middle of the game and for requesting board information), the game server 11 appropriately executes a process in accordance with the received information.

When determining that the received information is an expected move (step S403: YES), the game server 11 stores the expected move (step S404). That is, the expected move is stored in association with a user ID in the expected move storing unit 208.

Thereafter, the game server 11 returns the process to the step S402.

On the other hand, when determining that the received information is a move (step S403: NO), the game server 11 updates the game information, and transmits update information to each terminal 12 (step S405).

That is, the game server 11 appropriately updates the game information (board information, etc.) stored in the game-information storing unit 205 in accordance with the move transmitted from the terminal 12 of the player. Thereafter, the game server 11 transmits the updated game information (update information) to each terminal 12 in real time.

The game server 11 stores the move, and associates the expected move with the move (step S406).

That is, the game server 11 adds the move to the game record information stored in the history storing unit 206. Thereafter, the game server 11 associates the expected move stored in the expected move storing unit 208 at the step S404 with the move stored in the history storing unit 206 at this time by, for example, the value of the number of moves.

The game server 11 determines whether or not the Japanese chess game has ended (step S407). That is, it is determined whether or not either player won the Japanese chess game played through the terminals 12 of the individual players.

When determining that the Japanese chess game has not ended (step S407: NO), the game server 11 returns the process to the step S402, and repeats the process from the step S402 to the step S407.

On the other hand, when determining that the Japanese chess game has ended (step S407: YES), the game server 11 evaluates the expected move, and certifies the stage and the class (step S408).

For example, the game server 11 compares each expected move stored in the expected move storing unit 208 with a corresponding move stored in the history storing unit 206, and counts the rate that expected moves match actual moves for each spectator, and evaluates the expected moves of each spectator. Based on the evaluation result, the stage and class representing a Japanese chess skill is certified.

The game server 11 transmits the certification information to an object terminal 12 (step S409). That is, the certification information is transmitted to the terminal 12 of each spectator whose stage and class are certified.

According to such a game control process, the Japanese chess game can progress in accordance with a move transmitted from the terminal 12 of the player, an expected move transmitted from the terminal 12 of the spectator is managed and is evaluated.

That is, a spectator is not just viewing a screen when watching the Japanese chess game, but thinks a next move, and transmits the thought-out move as an expected move to the game server 11. The expected move is evaluated at a predetermined timing, so that the spectator makes an effort to try to think a better expected move while watching the Japanese chess game more seriously.

In other words, unlike a case where a match-up is broadcasted through a TV program, a spectator can enjoy watching the match-up more while taking the advantage of the characteristic of the network-compatible match-up game.

This results in an improvement of the amusingness of the spectator in a match-up game.

Other Embodiments

In the foregoing embodiment, the explanation has been given of the case where the certification information of a stage and class is transmitted as an evaluation result to the terminal 12 of a spectator. Information transmitted to the terminal 12 of a spectator is, however, not limited to such certification information, and is arbitrarily.

For example, the spectator evaluation unit 209 may collect evaluation results of all spectators, acquire a ranking (order or the like) for each spectator, and transmit ranking information to the terminal 12 of a spectator.

In the foregoing case, a spectator can figure out his/her skill (stage, class) of the Japanese chess and the rank (order), but cannot know what move other spectators expect. Therefore, a spectator can be made to know the expected move of another spectator.

For example, the expected move management unit 207 stores the skill (stage, class) of a spectator when storing an expected move in the expected move storing unit 208. It is supposed that the skill is acquired from information stored in the terminal-information storing unit 201 and shown in FIG. 4B. The spectator evaluation unit 209 collects expected move stored in the expected move storing unit 208 for each skill at a predetermined timing or in response to a request by the terminal 12. Such a collection result is transmitted to the terminal 12 from the information transmission unit 210.

In the foregoing embodiment, the explanation has been given of the case where an expected move transmitted from the terminal 12 of a spectator is evaluated in the game server 11. However, the expected move by the spectator may be evaluated on the terminal 12 side.

Figure 11:
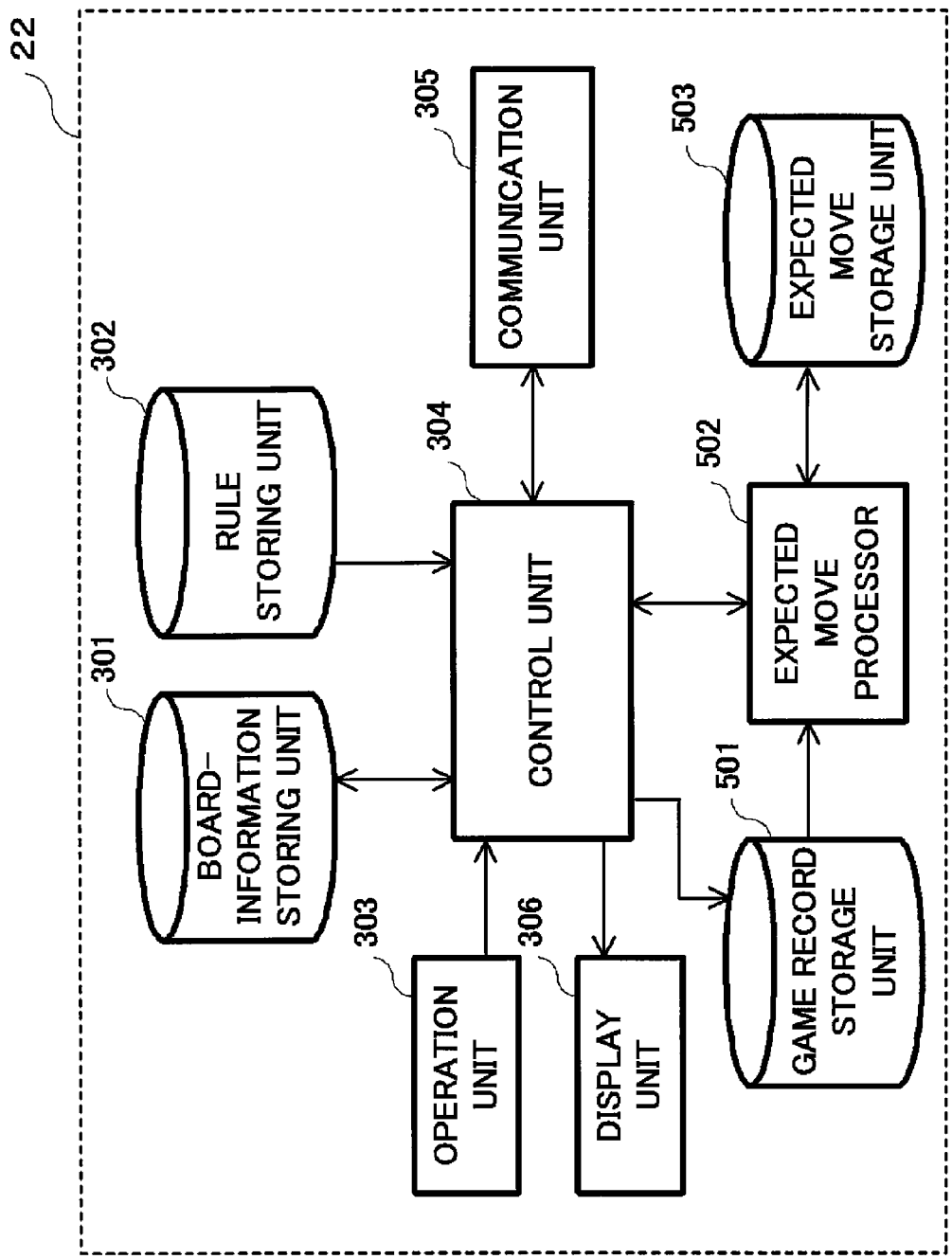
FIG. 11 is a schematic diagram showing the general structure of the terminal according to another embodiment of the invention.

Hereinafter, an explanation will be given of a terminal 22 which can evaluate the expected move of a spectator with reference to FIG. 11. FIG. 11 is a schematic diagram showing the general structure of the terminal 22 according to another embodiment of the invention. Note that the terminal 22 can be used by both player and spectator, but in the figure, a structure is shown for a case where the terminal 22 is used by a spectator (a case where a user is entered as a spectator) to facilitate the explanation.

The terminal 22 has a board-information storing unit 301, a rule storing unit 302, an operation unit 303, a control unit 304, a communication unit 305, a display unit 306, a game record storage unit 501, an expected move processor 502, and an expected move storing unit 503.

In comparison with the structure of the terminal 12 shown in FIG. 8, the terminal 22 differs that the game record storage unit 501, the expected move processor 502, and the expected move storing unit 503 are added.

The game record storage unit 501 is controlled by the control unit 304, and stores a move of a player as game record information. That is, the control unit 304 specifies a move from update information transmitted from the game server 11 through the communication unit 305, and the move is addingly stored as game record information in the game record storage unit 501.

The game record information stored in the game record storage unit 501 is information equal to the game record information stored in the game server 11 (history storing unit 206) and shown in FIG. 6.

The expected move processor 502 manages an expected move thought out by a spectator, and evaluates the expected move at a predetermined timing.

For example, as an expected move is input through the operation unit 303, the expected move processor 502 stores the expected move in the expected move storing unit 503. Thereafter, when an actual move by a player is added in the game record storage unit 501, the expected move processor 502 manages the move in the game record storage unit 501 in association with an expected move in the expected move storing unit 503.

The expected move processor 502 compares the expected move stored in the expected move storing unit 503 with the corresponding move stored in the game record storage unit 501 at a time of, for example, resignation of the game, and comprehensively evaluates each expected move. For example, a rate that expected moves match actual moves is counted, and an expected move is evaluated based on that rate. At this time, a predetermined weight may be added to a move which had an impact on the game situation, or a predetermined weight may be added to the move of the winner, thereby appropriately correcting the evaluation of an expected move.

The expected move storing unit 503 stores an expected move of a spectator. That is, the expected move storing unit 503 is controlled by the expected move processor 502, and stores an expected move input through the operation unit 303.

An expected move stored in the expected move storing unit 503 is associated with a move in the game record storage unit 501 (actual move by a player) by, for example, the value of the number of moves.

Figure 12:
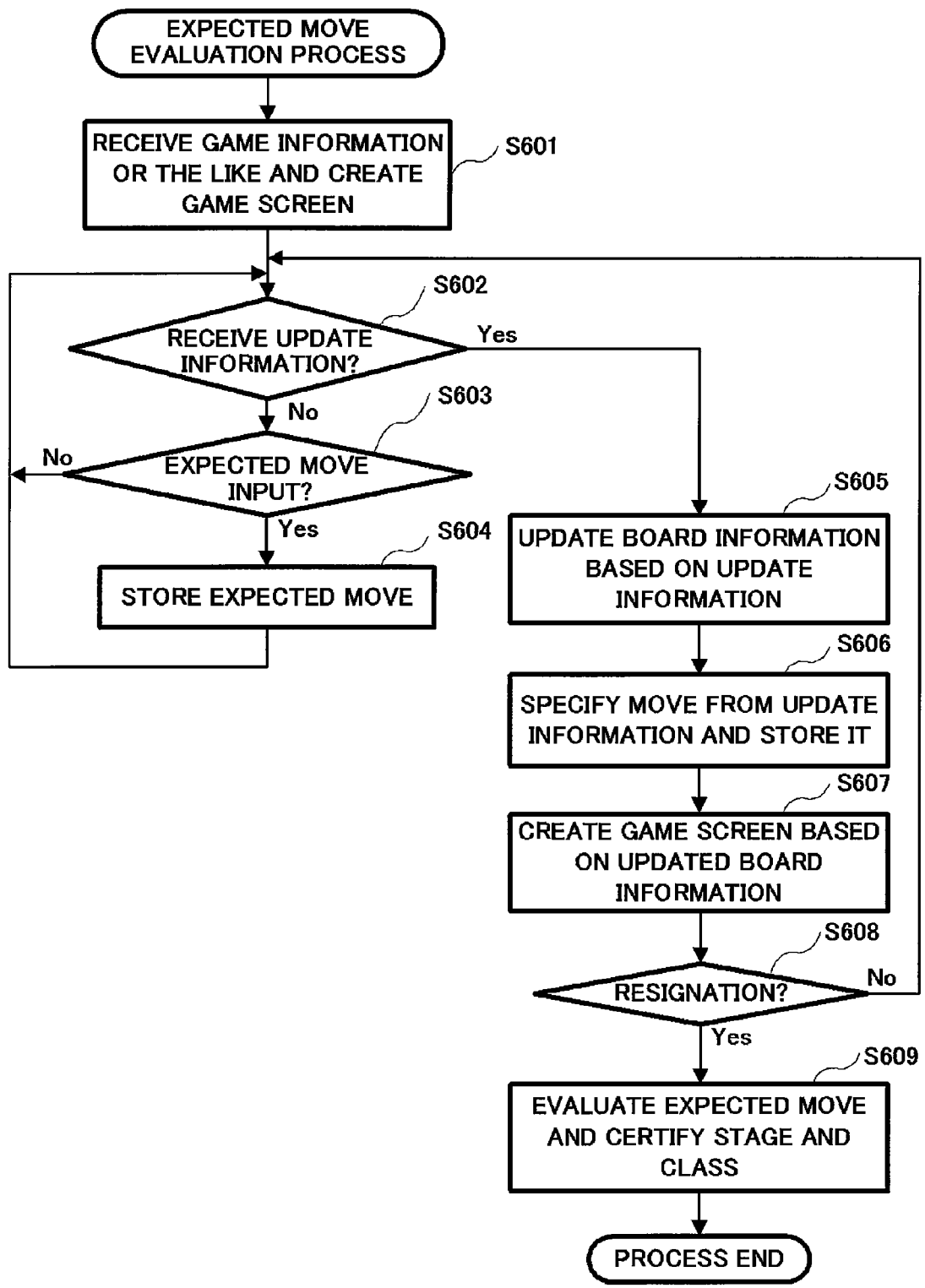
FIG. 12 is a flowchart for explaining an expected-move evaluation process executed by the terminal.

Hereinafter, the operation of the terminal 22 having such a structure will be explained with reference to FIG. 12. FIG. 12 is a flowchart showing the flow of an expected move evaluation process executed by the terminal 22 of a spectator. The expected move evaluation process is executed with the start of a Japanese chess game after the terminal 22 entered as a spectator accesses the game server 11.

First, the terminal 22 receives the game information or the like transmitted from the game server 11 with the start of the game, and creates an initial game screen (step S601).

The terminal 22 determines whether or not update information transmitted to the game server 11 is received (step S602).

When determining that the update information is not received (step S602; No), the terminal 22 determines whether or not an expected move is input (step S603).

When determining that an expected move is input (step S603; Yes), the terminal 22 stores the expected move in the expected move storing unit 503 (step S604). Thereafter, the terminal 22 returns the process to the step S602. On the other hand, when determining that an expected move is not input (step S603; No), the terminal 22 returns the process to the step S602.

When determining that update information transmitted from the game server 11 is received (step S602: YES), the terminal 22 updates the board information stored in the board-information storing unit 301 in accordance with the received update information (step S605).

The terminal 22 specifies a move from the update information, and stores the specified move in the game record storage unit 501 (step S606).

The terminal 22 creates a game screen from the updated board information (step S607). That is, the terminal 22 updates the game screen.

The terminal 22 determines whether or not the viewed Japanese chess game has ended (step S608).

When determining that the Japanese chess game has not ended (step S608; No), the terminal 22 returns the process to the step S602, and repeats the process from the step S602 to the step S608.

On the other hand, when determining that the Japanese chess game has ended (step S608; Yes), the terminal 22 evaluates an expected move, and certifies a stage and a class (step S609).

For example, the terminal 22 compares each expected move stored in the expected move storing unit 503 with a corresponding move stored in the game record storage unit 501, counts a rate that expected moves match actual moves, and evaluates the expected move of a spectator. Based on the evaluation result, a stage and class representing the skill of the Japanese chess are certified.

The terminal 22 creates a message indicating the certified stage and class, and displays the message. The terminal 22 may transmit certification information to the game server 11, and the game server 11 may manage the certification result.

According to such an expected move evaluation process, the expected move of a spectator can be evaluated on the terminal 22 side.

In this case, a spectator also thinks a next move, and input the thought out move as an expected move when watching the Japanese chess game. The expected move is evaluated at a predetermined timing, so that the spectator watches the Japanese chess game more seriously, and makes an effort to think out a better expected move.

That is, unlike the case where a match-up is broadcasted through a TV program, the spectator enjoys the watching itself while taking the advantage of the characteristic of the network-compatible match-up game.

This results in an improvement of the amusingness of the spectator in a match-up game.

In the foregoing embodiment, the explanation has been given of the case where a spectator is evaluated at the time of the end (resignation) of the match-up game, the timing at which the spectator is evaluated is not limited to at the time of the end of the match-up game, and for example, evaluation may be made for each expected move.

Specifically, an explanation will be given of an example case where players A and B play a match-up game, and a spectator thinks en expected move of the player A.

First, when the expected move by the spectator matches the move by the player A, the expected move by the spectator is evaluated based on the response of the player B. For example, in a case where greater than or equal to a certain time is required until the player B does a next move, the expected move by the spectator is highly evaluated. In addition, in a case where the player B requests "changing of a move" (changing of a move by player B before the previous move), and in a case where the player B takes an extreme defensive formation (specifically, for example, the player B moves the "Rook" or "Bishop" positioned in the opponent field into his/her own field, or the player B puts a piece in hand better than or equal to "Silver General"), the expected move by the spectator may be highly evaluated.

A move by a player is not always a good move, in a case where an expected move by the spectator does not match the move by the player A, when it is possible to determined that the move by the player A is bad, the expected move by the spectator may be evaluated with a certain measure. For example, in a case where the player A requests "changing of a move" after a successive move by the player B, the expected move by the spectator is evaluated as a good move. In addition, in a case where it requires a certain time until the player A makes a move after the move by the player B, or in a case where the player A takes an extreme defensive formation by a next move, the expected move by the spectator may be evaluated as a better move.

Further, the expected move by a spectator may be compared with the expected move by another spectator to do comparative evaluation. For example, expected moves by all spectators or spectators having a skill greater than or equal to a certain level are collected, and what rate the expected move of a spectator matches other expected moves is determined, thereby comparatively evaluating the expected move by that spectator.

In those cases, an evaluation is quickly acquired for an expected move by a spectator, so that the spectator can enjoy the watching itself more while taking the advantage of the characteristic of the network-compatible match-up game. This results in an improvement of the amusingness of the spectator in a match-up game.

Regarding the terminal 22 shown in FIG. 11, the explanation has been given of the case where the spectator watches the Japanese chess game in real time, but the invention can be adopted to a case where the spectator watches a Japanese chess game played in the past. For example, the game server 11 may read past game record information stored in the history storing unit 206, create update information for each predetermined timing, and transmit the update information to the terminal 22 or the like of a spectator.

Moreover, the invention can be adopted to a post mortem after a Japanese chess game has ended.

In this case, because the terminal 22 stores the game record information in the game record storage unit 501, it is possible for a spectator, etc. to review the game from an arbitrary situation, and to put another move, thereby doing a post mortem.

Figure 13:
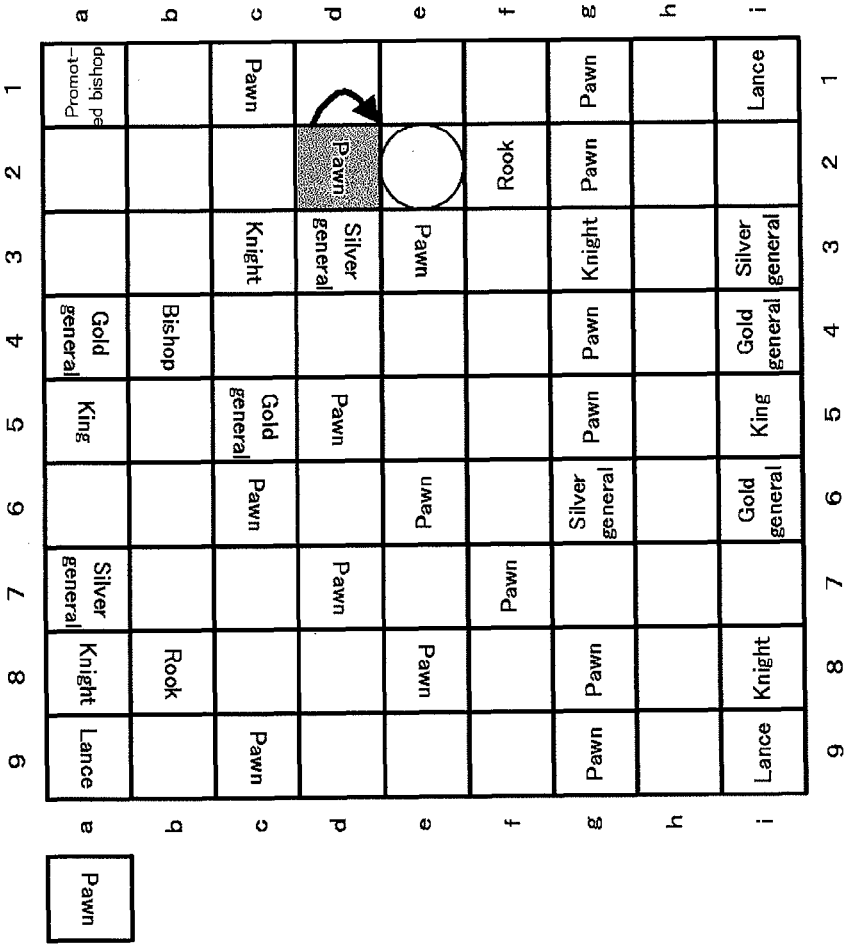
FIG. 13 is a schematic diagram showing an example of a game screen of a post mortem displayed on the terminal.

For example, the terminal 22 creates a game screen for a post mortem shown in FIG. 13 and displays that screen. The spectator operates move buttons MB on the screen, and progresses or reverses the move in accordance with the game record. Note that it is possible to verify a move (expected move or the like) by himself/herself while selecting a piece and freely moving the selected piece at an arbitrarily situation.

After the verification, a return button RB is operated, and the game screen is returned in accordance with the game record right before a piece is moved by the spectator.

Specifically, in a case where a piece is arbitrarily moved and the situation becomes different from the game record, the terminal 22 stores the position of the piece (number of moves, or the like), and returns the situation to the original game record in response to an instruction of returning the game record (operation of the return button RB).

In the foregoing embodiment, Japanese chess game has been explained as an example of a match-up game, but a match-up game is not limited to the foregoing case, and can be selected arbitrarily. For example, the invention can be adopted to a match-up game, such as game of go, chess, Othello, and mah-jongg.

The present application claims the benefit of the priority based on Japanese Patent Application No. 2006-037429, and the content of which is incorporated by reference in the present application.

INDUSTRIAL APPLICABILITY

As explained above, according to the invention, there is provided a game server, a spectator evaluation method, an information recording medium and a program which is suitable for improving the amusingness of a spectator who watches a match-up game.

The invention claimed is:

1. A game server which manages a player terminal which executes a predetermined match-up game, and a spectator terminal for watching the match-up game, the player terminal and the spectator terminal being connected to the game server via a network, and the game server comprising:
    a providing unit which provides a current status of the match-up game, which progresses based on moves successively acquired from the player terminal, to the spectator terminal;
    an acquisition unit which acquires an expected move of a first player thought out by a spectator from the spectator terminal before a next move of the first player of the match-up game is acquired from the player terminal; and
    an evaluation unit which compares the acquired expected move by the spectator with an actual move acquired from the player terminal, and evaluates the expected move by the spectator as a function of the actual move of the first player and a subsequent move by a second player,
    wherein the evaluation unit evaluates the acquired expected move by the spectator as high if the acquired expected move does not match the actual move and at least one of the following:
    a time period elapsed until the first player takes a further subsequent move is greater or equal to a predetermined time period;
    the first player changes the further subsequent move; or,
    the further subsequent move is a defensive move.

2. A game server which manages a player terminal which executes a predetermined match-up game, and a spectator terminal for watching the match-up game, the player terminal and the spectator terminal being connected to the game server via a network, and the game server comprising:
    a providing unit which provides a current status of the match-up game, which progresses based on moves successively acquired from the player terminal, to the spectator terminal in real time;
    an acquisition unit which acquires an expected move of a first player thought out by a spectator from the spectator terminal only before a next move of the first player of the match-up game is acquired from the player terminal; and
    an evaluation unit which compares the acquired expected move by the spectator with an actual move acquired from the player terminal, and evaluates the acquired expected move by the spectator as a function of the actual move of the first player and a subsequent move by a second player, wherein the evaluation unit evaluates the acquired expected move by the spectator as high if the acquired expected move does not match the actual move and at least one of the following:
    a time period elapsed until the first player takes a further subsequent move is greater or equal to a predetermined time period;
    the first player changes the further subsequent move; or,
    the further subsequent move is a defensive move.

3. A spectator evaluation method for a server which manages a player terminal which executes a predetermined match-up game, and a spectator terminal for watching the match-up game, the player terminal and the spectator terminal being connected to the server via a network, and the method comprising:
    a providing step of providing a current status of the match-up game, which progresses based on moves successively acquired from the player terminal, to the spectator terminal;
    an acquisition step of acquiring an expected move of a first player thought out by a spectator from the spectator terminal before a next move of the first player of the match-up game is acquired from the player terminal; and
    an evaluation step of comparing the acquired expected move by the spectator with an actual move acquired from the player terminal, and of evaluating the expected move by the spectator as a function of the actual move of the first player and a subsequent move by a second player, wherein the evaluation step evaluates the acquired expected move by the spectator as high if the acquired expected move does not match the actual move and at least one of the following:
    a time period elapsed until the first player takes a further subsequent move is greater or equal to a predetermined time period;
    the first player changes the further subsequent move; or,
    the further subsequent move is a defensive move.

4. A non-transitory information recording medium recording a program, the program controlling a computer which manages a player terminal which executes a predetermined match-up game, and a spectator terminal for watching the match-up game, the player terminal and the spectator terminal being connected via a network, to function as:
    a providing unit which provides a current status of the match-up game, which progresses based on moves successively acquired from the player terminal, to the spectator terminal;
    an acquisition unit which acquires an expected move of a first player thought out by a spectator from the spectator terminal before a next move of the first player of the match-up game is acquired from the player terminal; and an evaluation unit which compares the acquired expected move by the spectator with an actual move acquired from the player terminal, and evaluates the acquired expected move by the spectator as a function of the actual move of the first player and a subsequent move by a second player, wherein the evaluation unit evaluates the acquired expected move by the spectator as high if the acquired expected move does not match the actual move and at least one of the following:

a time period elapsed until the first player takes a further subsequent move is greater or equal to a predetermined time period;

the first player changes the further subsequent move; or, the further subsequent move is a defensive move.

* * * * *